(12) United States Patent
Jackson et al.

(10) Patent No.: US 7,280,301 B1
(45) Date of Patent: Oct. 9, 2007

(54) TEMPERATURE ESTIMATOR FOR ELECTRONIC DEVICE

(75) Inventors: Robert Jackson, Union City, CA (US); Donald E. Adams, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 53 days.

(21) Appl. No.: 10/962,216

(22) Filed: Oct. 7, 2004

Related U.S. Application Data

(60) Provisional application No. 60/509,301, filed on Oct. 7, 2003.

(51) Int. Cl.
G11B 15/18 (2006.01)
G11B 5/09 (2006.01)

(52) U.S. Cl. .......................................... 360/69; 360/46
(58) Field of Classification Search ...................... None
See application file for complete search history.

(56) References Cited

U.S. PATENT DOCUMENTS

| | | | |
|---|---|---|---|
| 5,940,785 A * | 8/1999 | Georgiou et al. ............ 702/132 |
| 5,991,505 A * | 11/1999 | Frank ............................ 388/828 |
| 6,078,455 A * | 6/2000 | Enarson et al. ................ 360/68 |
| 6,124,998 A * | 9/2000 | Kanegae ........................ 360/68 |
| 6,266,203 B1 * | 7/2001 | Street et al. .................... 360/69 |
| 6,441,586 B1 * | 8/2002 | Tate et al. ...................... 320/132 |
| 6,643,081 B1 * | 11/2003 | Walker et al. ................. 360/31 |
| 6,657,932 B1 * | 12/2003 | Ku et al. .................. 369/44.29 |
| 6,665,163 B2 * | 12/2003 | Yanagisawa ................. 361/103 |
| 6,731,453 B2 * | 5/2004 | Korbel et al. .................. 360/69 |
| 6,744,586 B2 * | 6/2004 | Ukani et al. ................... 360/69 |
| 6,747,838 B2 * | 6/2004 | Korbel et al. ............. 360/78.06 |
| 6,954,320 B2 * | 10/2005 | Yang ............................. 360/69 |
| 7,027,250 B2 * | 4/2006 | Lau ............................... 360/69 |

* cited by examiner

*Primary Examiner*—K. Wong
(74) *Attorney, Agent, or Firm*—Myers Bigel Sibley & Sajovec, P.A.

(57) ABSTRACT

A method and apparatus which can provide a temperature estimate in a hard disk drive or other electronic device is provided. Output from the sensor, which may be indicative of a location spaced from the target temperature location, is sampled and integrated over an interval of time to form an estimate of average input sensor voltage. During the time interval, history of the HDD pre-amplifier operating modes is accumulated. The results are combined to form an estimate of HDA ambient temperature. Sensor offsets associated with each power mode, and weighted to the corresponding mode duty, can be subtracted from the average input sensor voltage.

60 Claims, 9 Drawing Sheets

FIG. 6

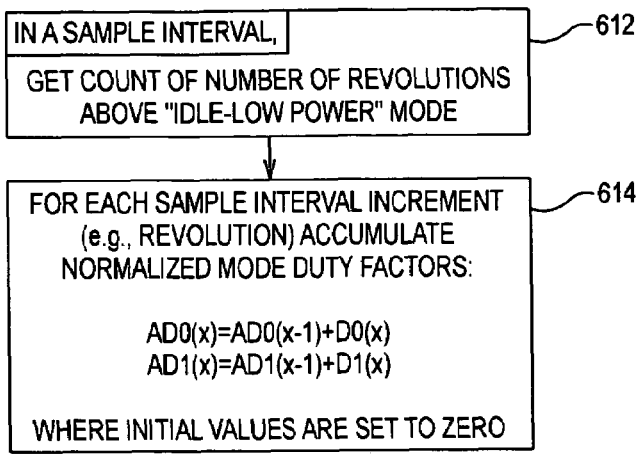

612 — IN A SAMPLE INTERVAL, GET COUNT OF NUMBER OF REVOLUTIONS ABOVE "IDLE-LOW POWER" MODE

614 — FOR EACH SAMPLE INTERVAL INCREMENT (e.g., REVOLUTION) ACCUMULATE NORMALIZED MODE DUTY FACTORS:

$$AD0(x) = AD0(x-1) + D0(x)$$
$$AD1(x) = AD1(x-1) + D1(x)$$

WHERE INITIAL VALUES ARE SET TO ZERO

FIG. 7

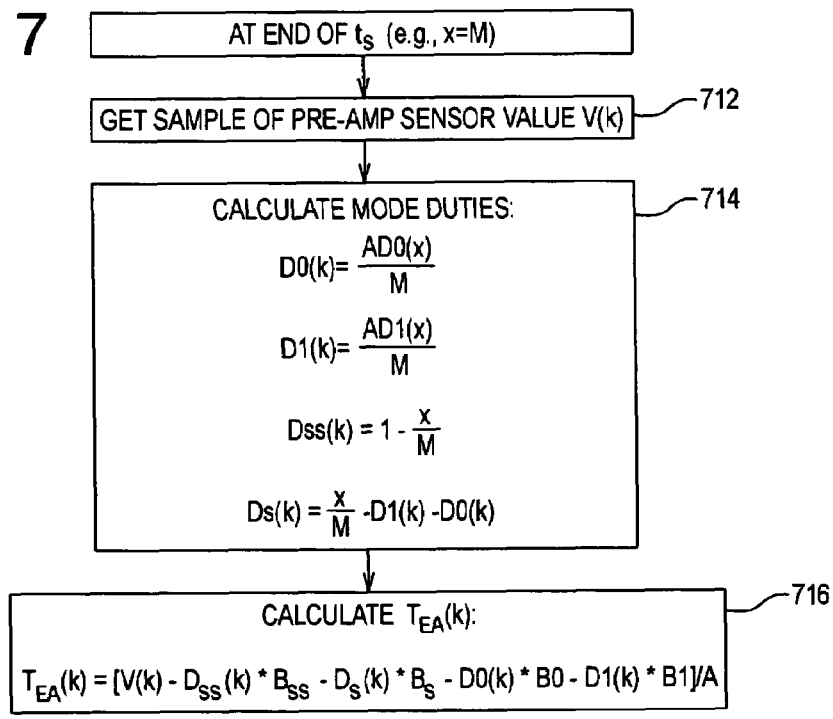

AT END OF $t_s$ (e.g., x=M)

712 — GET SAMPLE OF PRE-AMP SENSOR VALUE V(k)

714 — CALCULATE MODE DUTIES:

$$D0(k) = \frac{AD0(x)}{M}$$

$$D1(k) = \frac{AD1(x)}{M}$$

$$Dss(k) = 1 - \frac{x}{M}$$

$$Ds(k) = \frac{x}{M} - D1(k) - D0(k)$$

716 — CALCULATE $T_{EA}(k)$:

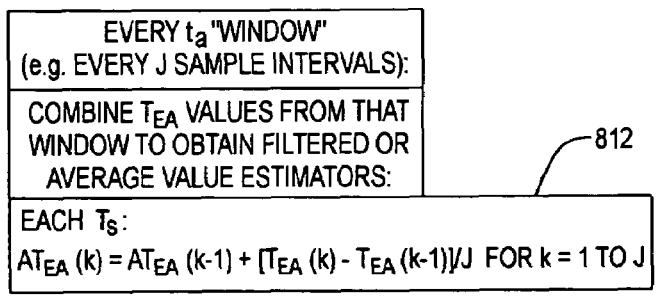

EVERY $t_a$ "WINDOW" (e.g. EVERY J SAMPLE INTERVALS):

812 — COMBINE $T_{EA}$ VALUES FROM THAT WINDOW TO OBTAIN FILTERED OR AVERAGE VALUE ESTIMATORS:

EACH $T_S$:
$$AT_{EA}(k) = AT_{EA}(k-1) + [T_{EA}(k) - T_{EA}(k-1)]/J \text{ FOR } k = 1 \text{ TO } J$$

TEMPERATURE ESTIMATOR FOR ELECTRONIC DEVICE

CROSS-REFERENCE TO RELATED APPLICATIONS

Priority is claimed from U.S. Provisional Patent Application Ser. No. 60/509,301, filed Oct. 7, 2003, entitled "Low Cost Integrated HDA Temperature Estimator", which is incorporated herein by reference in its entirety.

FIELD OF THE INVENTION

The present invention is directed to a method and apparatus for estimating temperature in an electronic device and, in particular, for estimating temperature of a location which may be spaced from a temperature sensor using information indicative of the history of operation of the electronic device such as the history of operation modes of the device.

BACKGROUND INFORMATION

A number of electronic devices can benefit from the availability of information indicating one or more temperatures of the electronic device (or portions thereof). In at least some cases, it can be valuable to provide such temperature estimate information with a relatively high degree of accuracy and/or a relatively small time lag between a measurement and the output of an estimate. In at least some cases, it can be valuable to provide such temperature estimate information with relatively high frequency.

Although the present invention can be applied in any of a number of types of electronic devices, one example of an electronic device in which accurate, frequent and prompt temperature estimates are believed particularly valuable is in hard disk drives (HDD) including the types typically used in, or with, personal computers.

A number of aspects of HDD operation are temperature-related. Knowledge of ambient or head-disk assembly (HDA) temperature can be useful in at least some approaches to flying height adjustment. In a typical HDD, it is important to maintain the read/write head a predetermined distance ("flying height") from the adjacent disk surface. Recent trends have been toward providing HDD's with relatively smaller flying heights (generally associated with attempts to increase areal data density in HDD's) and the tolerance for the flying height generally decreases as the flying height itself decreases. The thermal expansion effect known as "pole tip protrusion" (PTP) (described, e.g., in U.S. patent application Ser. No. 10/338,046, filed Jan. 6, 2003, entitled "Head-Disk Interference Detection Method and Apparatus," which is incorporated herein by reference) is affected by temperature in the HDD and is particularly strongly related to temperature of the HDA of the HDD. Magnetic over-write, which affects the HDD error rate margin, is also a function of temperature. In fact, increasing the write current, at all temperatures, to overcome the over-write problems will generally exacerbate the clearance problem. Accordingly, design margins for head-disk clearance and/or magnetic performance of the head and disk are affected by the temperature, particularly the HDA temperature, of the HDD.

Devices and procedures have been developed which can at least partially compensate for such thermal effects with a reasonable degree of success. However, the success of such compensation is related to the accuracy of (substantially) real-time knowledge of the HDA temperature. Accordingly, it would be useful to provide a method and apparatus for estimating temperature (especially for supporting areal density growth at expected costs and reliability) in a manner which provides temperature estimates which are sufficiently accurate, reliable, frequent and low-lag, preferably in a cost-effective manner.

It is possible to add one or more discrete (non-integrated) temperature sensors to the HDD for such purposes. Examples include thermistors or thermal-diode circuits. In general, discrete sensors would be connected to an analog-to-digital converter (ADC), e.g., via multiplexing switches to enable the HDD processor to convert the sensor output to an HDA temperature estimate. Some discrete sensors have a built-in ADC but are often avoided because of cost. The conversion to the HDA temperature can be, e.g., very simple scaling and can include sensor calibration and linearization. To use such discrete sensors for estimating HDA temperature, the sensor would be best located in the HDA. If, instead, a discrete sensor is positioned on the PCB, in order to retain a degree of correlation of the sensor to the actual HDA temperature, the discrete sensor should be located as close as feasible to the HDA (e.g., on the side of the PCB facing the HDA, preferably isolated from external heat sources and/or airflow). Although discrete sensors can be used to estimate HDA temperature, it is believed that the cost of this approach is undesirably high. High costs associated with the discrete sensor approach are associated not only with the incremental cost of the sensor but also packaging constraints, added parts (that can reduce reliability and yield), and other potential problems. Accordingly, it would be useful to provide HDA temperature estimates while avoiding undesirable costs such as those associated with using discrete sensors.

One approach to avoiding the incremental costs associated with discrete sensors would be to make use of one or more sensors which are already present in the HDD, for another purpose. For example, many HDD's employ application specific integrated circuits (ASIC's) which have integrated heat sensors. These sensors, which are typically integrated versions of discrete thermal-diode circuits, are commercially available and are typically provided by ASIC vendors for purposes such as confirming operating power and thermal resistance of packaging, e.g., during development. Some HDD manufacturers make use of such integrated sensors during system design, e.g., to enhance reliability. Because such integrated sensors are provided by the ASIC manufacturer for specific purposes, it is not surprising that the output of such sensors are more directly indicative of the ASIC die temperature than, e.g., ambient temperature. The dynamic thermal response of the die, its package and the method of heat sinking also filter the observable sensor output, so that the output is, in general, more directly indicative of die temperature and less directly indicative of temperature at a location different from the ASIC die (such as ambient temperature in the HDA). Furthermore, the temperature of the ASIC die can fluctuate rapidly in response to changes in ASIC operating power (such as fluctuations resulting from changes in operating mode). Accordingly, it would be useful to provide a temperature estimator which can estimate temperatures at a distance from the sensor, e.g., by accounting for factors which affect sensor temperature.

One possible approach to using a sensor to estimate a temperature at a distant site would be to maintain the system or components thereof (such as the HDD pre-amp) in a predetermined operating mode for a period of time. For example, in one approach the pre-amplifier would be forced to a "read" mode for a sufficient time so that thermal transients expire (in at least some designs this would be a period of about 5 seconds). Such an approach, however, imposes severe command latency penalties on HDD performance whenever a temperature estimate is needed (which may be, for example, about once every 5 minutes). Although, for some applications, this type of latency would only have a small impact, for other applications (e.g., video-streaming or audio-streaming) such command latency usually would be unacceptable. Accordingly, it would be useful to provide a method and apparatus for estimating temperatures which could avoid the need to force an operating mode periodically or frequently (e.g., each time a temperature estimate is needed).

Another approach would be to force the system (or its components) to a pre-defined operating mode as described generally above, but to perform such procedure only when this would not interfere with desired or requested HDD usage. For example, rather than making a temperature estimate as needed, HDA temperature estimates would be delayed, e.g., until activity is low enough to allow a good reading. A difficulty with this approach is that, by using a previous temperature estimate until such time as it is convenient to obtain a new (accurate) estimate, there may be a relatively long delay until such convenient time occurs. Thus, the most recent previous temperature estimate (still) being used may significantly depart from the actual HDA temperature. Accordingly, it would be useful to provide a temperature estimate method and apparatus which is frequent enough to be sufficiently representative of actual temperature, without the need to delay or interrupt HDD read and write commands.

SUMMARY OF THE INVENTION

The present invention includes a recognition of the existence, source and/or nature of problems in previous or alternative approaches, including those described herein.

According to embodiments of the present invention, in order to obtain a temperature estimate for a device, information based on the output of a sensor which is at a position different from the target temperature position, is combined with information indicative of the operating mode history of the device (or components thereof). According to one embodiment of the invention, the target temperature is the temperature of the HDA or the ambient temperature of the HDD, while the sensor is an integrated sensor of a preamp, typically mounted in the HDA. In one embodiment, the sensor output is sampled and integrated over an interval of time $t_a$ while, during some or all of the same interval, history of the pre-amplifier operating modes is accumulated. These results are then combined to form an estimate of the HDA ambient temperature substantially at that instant (termed "Average Value Estimator"—AVE).

In one embodiment, a temperature estimate is obtained, e.g., during power-on, by a method which restricts the mode to "read" or "write" and samples the sensor output. After an interval $t_s$, another sample is taken, during which time the "write" mode history of the pre-amplifier is accumulated to form a correction value. These samples and the correction value are then combined to estimate the final value of the sensor output and then scaled to create an HDA temperature estimate (termed "final-value estimator"). Preferably, thereafter (i.e., after the power-on estimate) the "average-value estimator" (AVE) is used.

In another embodiment, the "final-value estimator" is used alone (i.e., not necessarily in combination with the average-value estimator), e.g., each time a HDA temperature estimate is requested. In some approaches, the sequence of estimates can be combined as a windowed average in a manner that will be understood by those with skill in the art at least after understanding the present disclosure.

In one embodiment of the invention, two or more estimators, each using an approach as described above, can be provided in an interleaved fashion, so as to yield temperature estimates more frequently than would be yielded by either estimator alone. It is also possible to construct a temperature estimator in a recursive fashion, described more thoroughly below, to increase the frequency with which estimates are available.

In one embodiment, a method and apparatus which can provide a temperature estimate in a hard disk drive or other electronic device is provided. Output from the sensor, which may be indicative of a location spaced from the target temperature location, is sampled and integrated over an interval of time to perform an estimate of average input sensor voltage. During the time interval, history of the HDD pre-amplifier operating modes is accumulated. The results are combined to form an estimate of HDA ambient temperature. Sensor offsets associated with each power mode, and weighted to the corresponding mode duty, can be subtracted from the average input sensor voltage.

BRIEF DESCRIPTION OF THE DRAWINGS

FIG. 6 is a flowchart illustrating a procedure according to an embodiment of the present invention;

FIG. 7 is a flowchart illustrating a procedure according to an embodiment of the present invention;

FIG. 8 is a flowchart illustrating a procedure according to an embodiment of the present invention;

DETAILED DESCRIPTION OF THE PREFERRED EMBODIMENT

Figure 1:
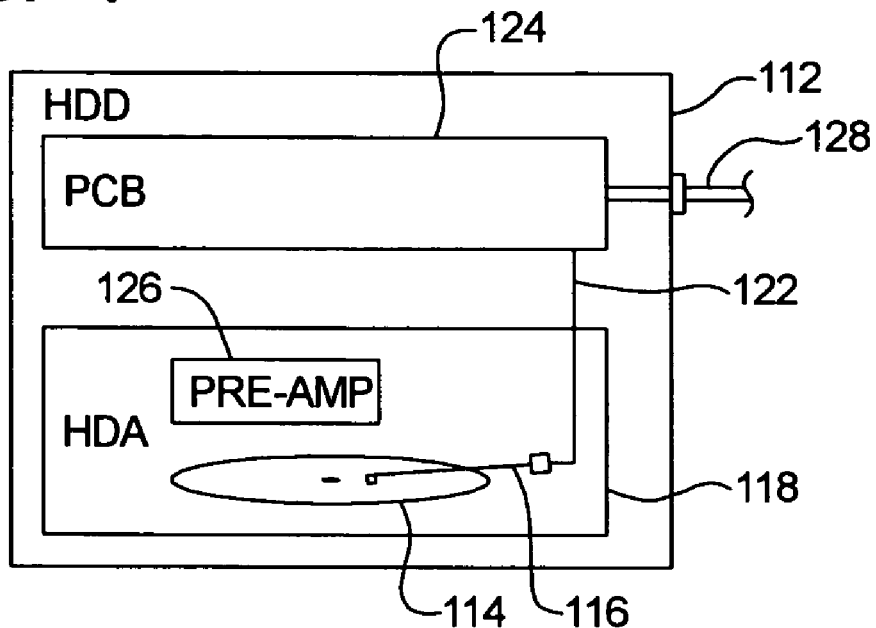
FIG. 1 is a schematic depiction of a hard disk drive (HDD) of a type usable in accordance with an embodiment of the present invention.

As depicted in FIG. 1, an HDD 112 includes one or more disks 114 and a read-write head connected to an arm moved by an actuator 116. In many designs, the head, disk and certain other components are sealed or enclosed, forming a component known as the head-disk assembly (HDA) 118. Wiring 122 couples the HDD to circuitry, commonly on a printed circuit board (PCB) 124. A preamp 126 is typically mounted in the HDA. The circuitry on the PCB 124 can, in some configurations, include an ASIC.

In an embodiment in which an integrated sensor is used on an ASIC outside the HDA, the HDD environmental temperature is an example of a temperature that can be estimated using an embodiment of the present invention. If the ASIC is in intimate contact with the HDA, embodiments of the present invention can be used to provide an estimate of HDA environmental temperature. The present invention can be used for estimating other temperatures, as will be understood by those of skill in the art, after understanding the present disclosure.

Wiring 128 provides for transmitting data, commands, status and similar information, as well as power, from and/or to a host device which is often a computer or may also be another device such as an audio or video recording or playback device, digital video recorder, and the like.

In one embodiment of the invention, it is desired to obtain an estimate of temperature which is generally representative of the HDA 118. The present invention can also be used for obtaining estimates of temperature other than those of the HDA, such as estimates more directly related to temperature of the head itself, HDD ambient temperature and the like, or temperatures in devices other than an HDD.

The present invention provides a relatively accurate and efficient way of estimating the temperature at a location which is different from the location of a temperature sensor used in the estimation method. For example, one embodiment uses an integrated temperature sensor of an ASIC, which is part of the pre-amp 126, in a process for estimating temperature of the HDA, even though the preamp die is at a location different from a location that would be representative of ambient HDA temperature (even though the preamp is typically mounted in the HDA). The greater temperature variability of the sensor is believed to be related to a number of factors, including that the pre-amplifier has a thermal time constant (time required to reach (−1/e) or about 0.632 of a newly impressed temperature) on the order of 1 or 2 seconds, as compared to the typical thermal time constant of the (more massive) HDA of about 20 or 30 minutes. Another feature contributing to the variability of the temperature at the sensor is the variability in power consumption (which may be related to rapid changes in operating mode) of the pre-amp 126 or other circuitry proximate to the sensor.

As noted above, an integrated sensor is typically provided (for other purposes) as a part of an ASIC, so that use of such a sensor avoids increasing a product's bill of material (BOM) cost. In at least one embodiment, the sensor provides data to a data processor (typically a microprocessor) by way of an ADC which is also already present for other purposes (and, thus, does not add to the BOM cost). Data from the sensor and ADC can be provided to processor or other circuitry, e.g., via switches under firmware control in a manner that will be understood by those of skill in the art at least after understanding the present disclosure.

Figure 2:
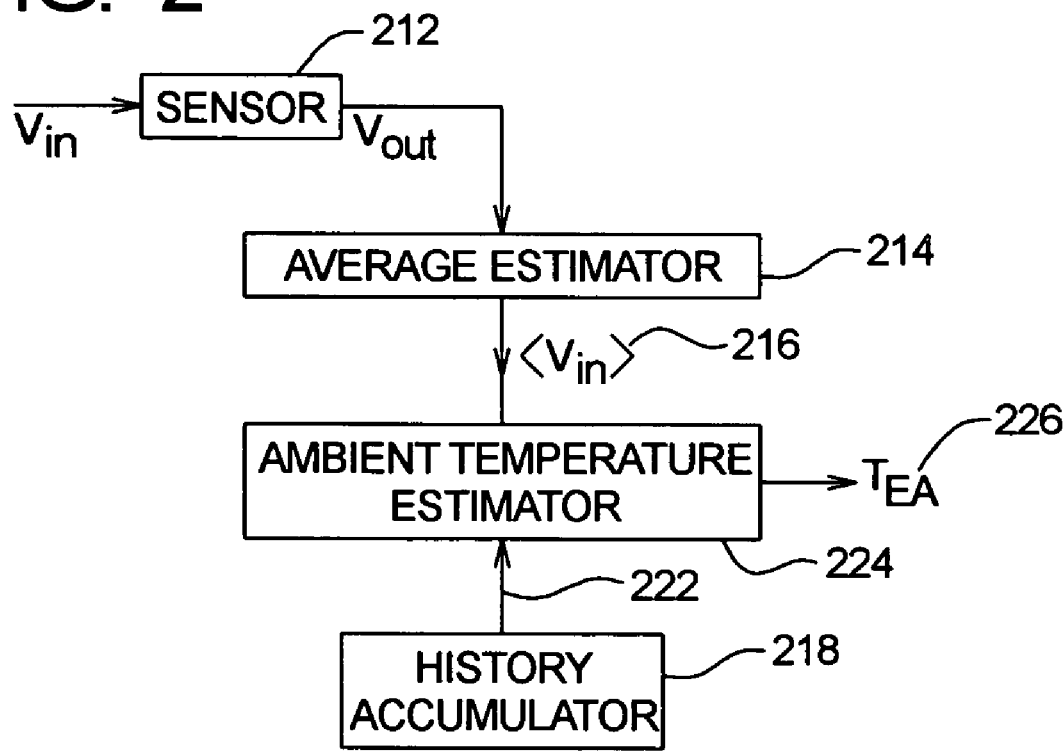
FIG. 2 is a flowchart illustrating a procedure according to an embodiment of the present invention.

FIG. 2 illustrates one manner of obtaining an estimated ambient temperature $T_{EA}$ 226, according to one embodiment of the present invention. The sensor 212 can be any of a number of temperature sensors, including thermistors or thermal-diode circuits and, in at least one embodiment, is an integrated version of a discrete thermal-diode circuit, integrated in an ASIC of a HDD pre-amp 126. The present invention is particularly useful in providing a temperature estimate for a device in which the sensor is spaced from the target temperature measurement location and/or is substantially affected by or otherwise "contaminated" by some features of the environment, e.g., by operating mode power.

The sensor 212 provides an output voltage $V_{out}$ which is substantially directly related to temperature changes at the location of the sensor 212. However, $V_{out}$ is not necessarily directly indicative of (average) input voltage $V_{in}$. As shown in FIG. 2, an average estimator 214 (preferably designed as described more fully below, to account for at least some aspects of the model of the sensor 212) outputs the value $<V_{in}>$ 216 from the $V_{out}$, over integration interval $t_a$. The integration interval $t_a$ should be long enough to provide representative sensor and history data but short enough to provide temperature estimates which are not so old as to be unrepresentative of current target temperatures. In one embodiment, an estimate is provided approximately each 0.7 seconds, although other embodiments can use techniques to achieve different estimate frequencies, including techniques such as multiple estimators and/or recursive techniques, as described more fully below.

During an interval which at least overlaps (and is preferably substantially equal to) $t_a$, a history accumulator provides output 222 indicative of, or related to, the history of the operating mode of the HDD. The ambient temperature estimator 224 receives the mode history information 222 and $<V_{in}>$ 216 and combines these in a way so as to output an estimated ambient temperature $T_{EA}$ 226.

Figure 3:
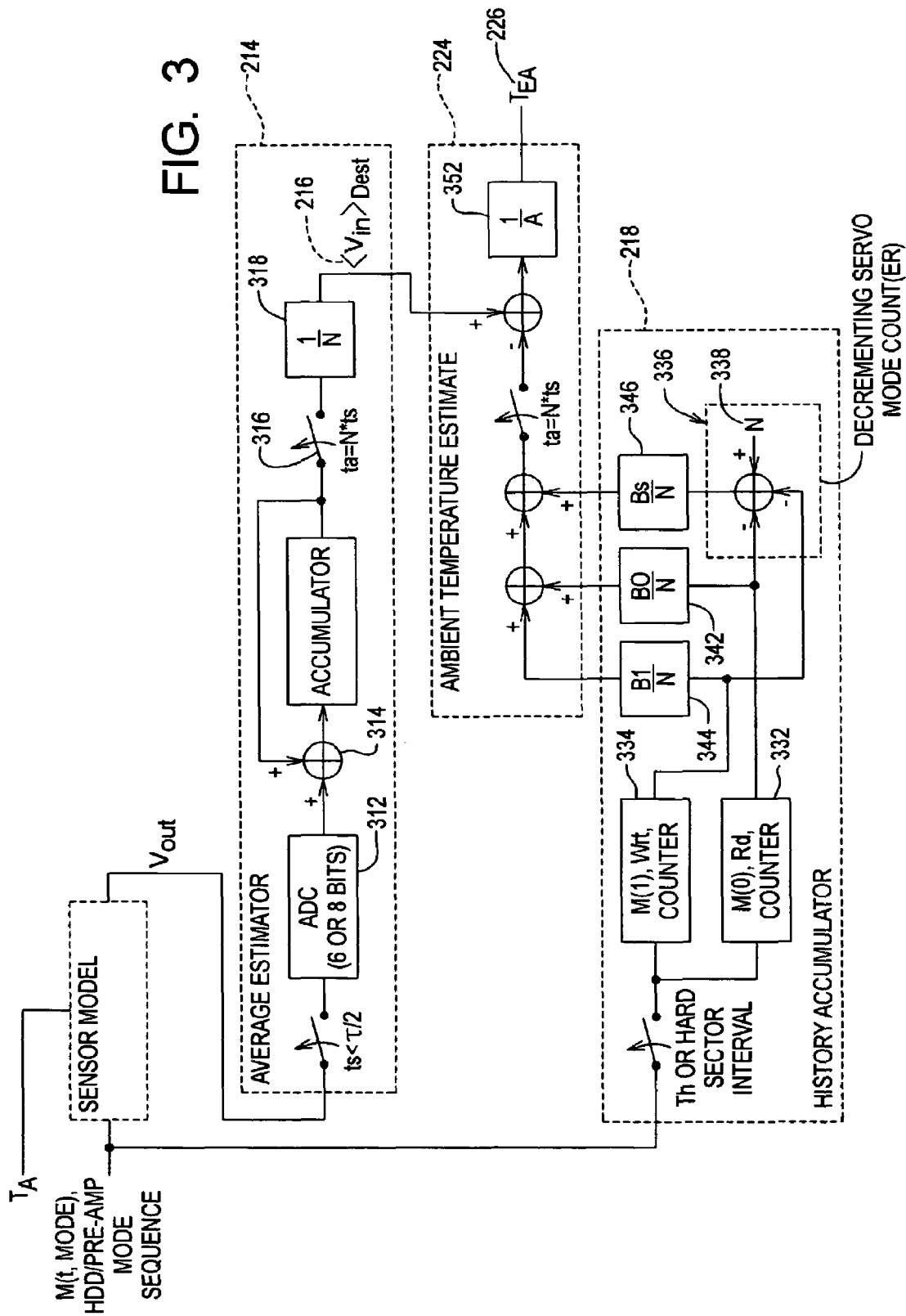
FIG. 3 is a flowchart illustrating a procedure according to an embodiment of the present invention.

As depicted in FIG. 3, the average estimator 214 receives $V_{out}$ which is converted to a digital value by an ADC 312. Successive outputs during a time interval $t_a$ are summed 314 and at the end of $t_s$ 316 are divided by the number of samples 318 to provide the estimated average input voltage $<V_{in}>$ 216.

In the embodiment depicted in FIG. 3, the history accumulator uses various sensor offsets (termed "B factors") associated with corresponding power modes. In the embodiment of FIG. 3, B0 is the offset associated with the read mode, B1 is the offset associated with write mode and $B_s$ is the offset associated with the "idle-perf" mode (when the servo is operating). As to the factor "$B_{ss}$" for the fourth mode (the "idle-low power" mode) there is little, if any, rise of the die temperature over ambient during the fourth mode. Therefore, $B_{ss}$ is not expressly referenced in FIG. 3. The values of the B factors can be determined in a number of ways including from theoretical calculations, modeling, and the like, but in at least one embodiment are preferably obtained during a calibration routine at the factory, e.g., as described more fully below.

In the embodiment of FIG. 3, the offsets B0, B1 and $B_s$ are weighted according to the fraction of the time the pre-amp 126 spent in the corresponding mode during the $t_a$ interval. As shown in FIG. 3, counters 332, 334 are initiated to zero at the beginning of $t_a$ and respectively accumulate the number of sensor sample times the pre-amp was in the read mode or write mode. Also, during the interval $t_a$, a decrementing counter 336, initially set 338 to a value of N, decrements when the pre-amp is in either the read mode or write mode. Thus, the decrementing counter 336 holds a value, at the end of $t_a$, after N samples, indicating the number of samples in which the pre-amp was in neither read mode nor write mode.

At the end of each $t_a$ interval, the values in each of the counters 332, 334, 336 are divided by the total number of samples N and multiplied by the respective offsets 342, 344, 346. As shown in FIG. 3, the temperature estimator 224, at the end of $t_a$ sums the three weighted offset factors and subtracts this sum from $<V_{in}>$. The result is then divided by a gain factor for the sensor (termed "A") 352 to yield $T_{EA}$ 226.

Figure 4:
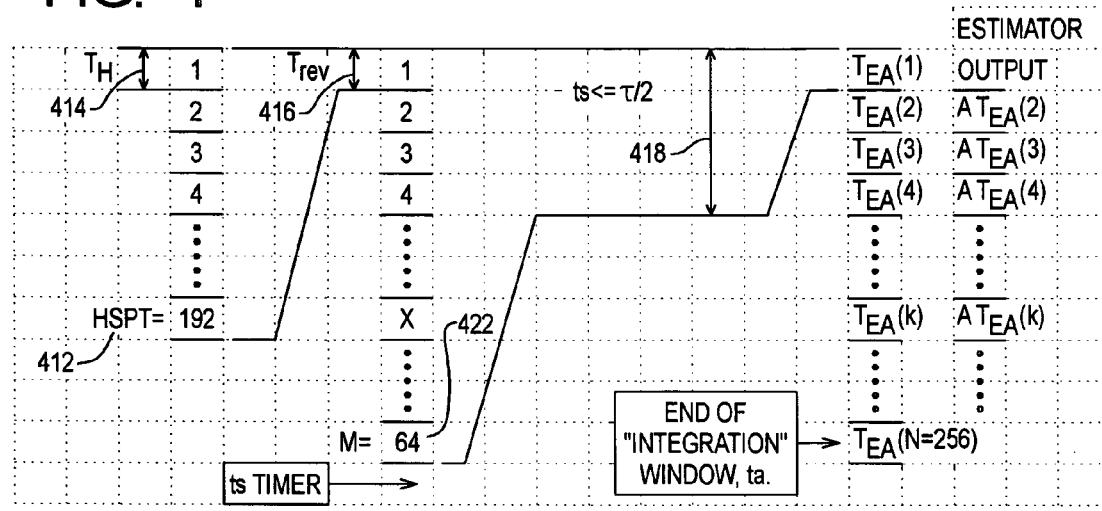
FIG. 4 is a flowchart illustrating a procedure according to an embodiment of the present invention.

FIG. 4 illustrates how, in some embodiments, to arrive at the temperature estimate, if the sample size N corresponds to a number of revolutions and each revolution has a number of sectors. In FIG. 4, the number of "hard" sectors (H-sectors) or servo sectors per track (HSPT) 412 is 192 with each H-sector representing a duration 414 of about 56 microseconds. Accordingly, the duration of a revolution, in this example, is about 11 milliseconds 416.

Figure 5:
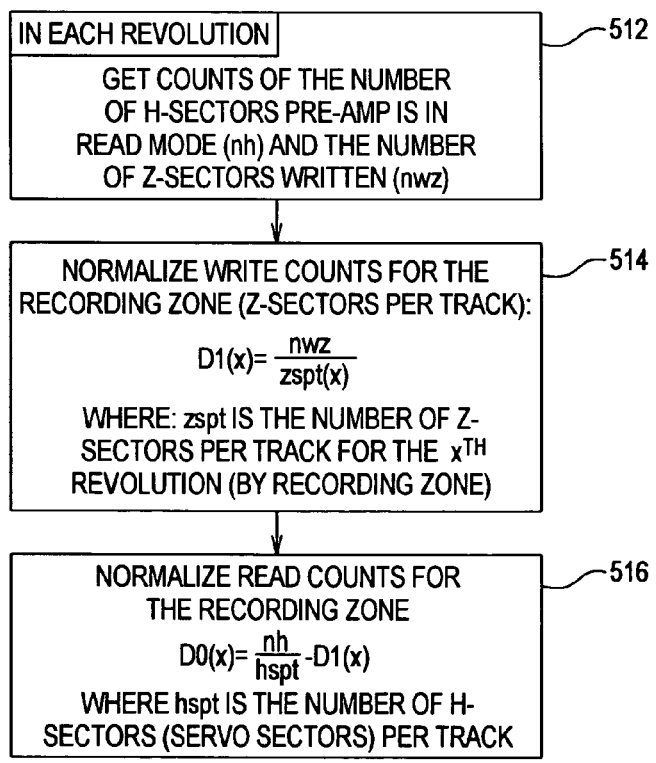
FIG. 5 is a flowchart illustrating a procedure according to an embodiment of the present invention.

During each revolution, FIG. 5 illustrates a manner of obtaining normalized read and write counts. In the embodiment of FIG. 5, during each revolution, the number of H-sectors during which the pre-amp is in read mode (NH) and the number of data sectors (termed "Z-sectors") which were written (NWZ) is obtained 512. The write count is normalized, such as by dividing the write count by the number of Z-sectors per track. The number of Z-sectors per track may vary across the radial extent of the disk. For example, in some devices, several different radial portions of the disk, termed "recording zones," are defined, with different recording zones having different numbers of Z-sectors per track.

During each sample interval 418, which may be more than one revolution, a count of the number of revolutions above "Idle-low power mode" is obtained 612 (FIG. 6). The normalized mode duty factors (calculated as shown in FIG. 5, 514, 516) are accumulated 614.

As indicated generally in FIG. 7, at the end of the sample interval $t_s$ (for example when the number of revolutions, x, equals M) 422, the estimator obtains a sample of the pre-amp sensor value V(k) 712 output by the average estimator 214. The mode counters will contain the accumulated mode duties and can be weighted by dividing by M 714. The weighted mode duties are multiplied by respective mode offsets and their sum is subtracted from V(k) and divided by the gain factor A to yield $T_{EA}$ for the ($k^{th}$) sample 716. The estimate in FIG. 7 is calculated 716 by a method which expressly includes consideration of the sleep mode duty cycle ($D_{ss}$ and $B_{ss}$) as contrasted with the configuration depicted in FIG. 3 (which includes only read, write and idle-perf or servo modes.)

In the embodiment depicted in FIG. 4, a set of temperature estimates $T_{EA}(k)$ where k=1 ... J, are combined to perform a filtered or averaged estimate of the target temperature. In one embodiment, this is done in a recursive fashion, such as depicted in FIG. 8. After every $t_s$ interval, to the previous value of $T_{EA}$, $1/J^{th}$ of the change in $T_{EA}$ over the previous $T_{EA}$ is added 812. At the end of J-such operations, $AT_{EA}(k)$ will be equal to the average of the previous J values of $T_{EA}$. Although, in the depicted embodiment, J has a fixed value (256 in the depiction of FIG. 4) yielding a simple low pass filter or average, it is also possible to provide implementations when J can be variable (e.g., up to a limit of the integration interval).

Although there are numerous ways of calculating an averaged or filtered value, the depicted recursive version is believed to be relatively easy to implement in current coding, likely to make future improvements relatively easier, and provides for relatively frequent updating of $AT_{EA}$ (at the sample rate $t_s$) to better follow dynamic behavior of HDA temperature. Because of the recursive nature of the described procedure, it is necessary to provide an initial value for AT ($AT_{EA}(0)$). It is believed the recursive procedure provides for a relatively easy implementation of such initialization.

In one embodiment, the initialization value $AT_{EA}(0)$ is obtained from a second manner of estimating $T_{EA}$ which can be, e.g., implemented upon leaving power-off or standby mode (the "final value estimate") $T_{EA}(0)$.

Figure 9:
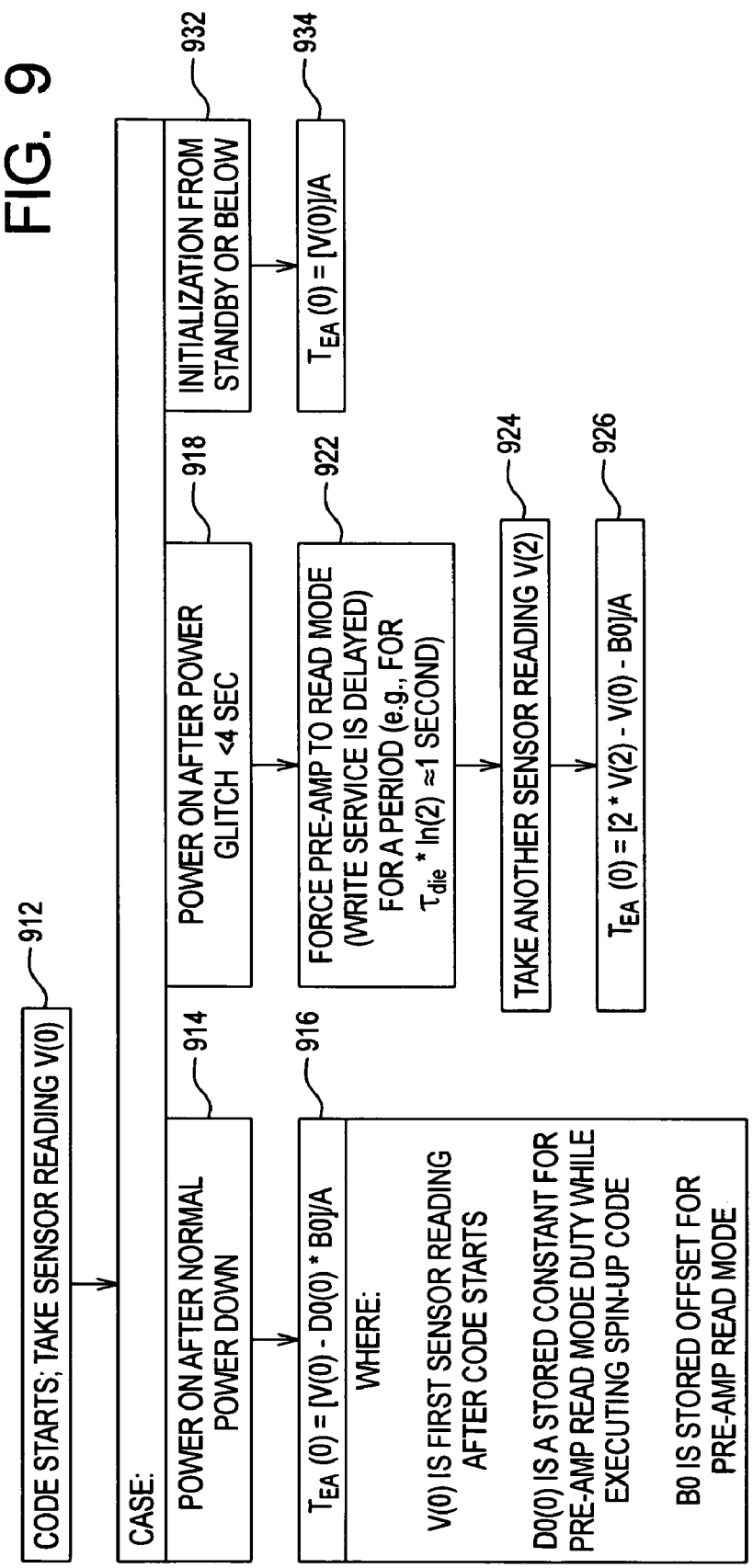
FIG. 9 is a flowchart illustrating a procedure according to an embodiment of the present invention.

In the embodiment depicted in FIG. 9, a first sensor reading V(0) is taken after the code starts 912. The initialization value for $T_{EA}$ then depends on whether this routine is being performed during a power-on following a normal power-down, following a power-glitch of less than a small period (such as 4 seconds), or is an initialization from a standby mode (or below). If the routine is being run during a power-on following a normal power-down 914, the HDD will have been in standby for several seconds (e.g., 4 or 5 seconds). The pre-amp, in at least some HDD's, is not activated at power-on for several seconds (such as around 2 seconds) during spin-up. Accordingly, the pre-amp die temperature can be expected to be within about 1° C. of the HDA ambient temperature before it is turned on (as the heads are loaded and diskware is read into memory). The only die heating that can occur in these circumstances, will be a result of this activity (which can be known beforehand). In this case, the initialization temperature estimate $T_{EA}(0)$ is calculated by subtracting the product of a stored constant "D0(0)" for pre-amp read mode duty while executing spin-up (which can be learned and fixed by design) times a stored offset for pre-amp read mode ("B0", preferably obtained during factory calibration and stored on the disk). This product is subtracted from V(0) and the result divided by A (sensor gain factor).

If the power-on is being formed after a short (such as less than about 4 seconds) power-glitch or similar event, the pre-amp is forced to the read mode, with write service being delayed 922 for a certain period. In the depicted embodiment, the period is selected to be equal to approximately the time constant of the die times ln(2) (equal, in the depicted embodiment, to about 1 second). Thereafter, another sensor reading is taken V(2) 924. The initialization temperature estimate $T_{EA}(0)$ is then taken as twice the second reading minus the first reading V(0) minus B0, all divided by A.

In the situation when the routine is being run during initialization following standby mode (or below) 932, in at least some HDDs, the processor will continue to run for a few seconds (such as 4 or 5 seconds) after the HDD has received a command to enter standby (or, e.g., when the high-level power manager in the HDD decides to go to standby). In such HDD models, it is typically necessary for the processor to continue running for this period to keep the heads on the ramp or in the landing zone while the spindle motor stops and the head latch engages. In general, the amount of time the processor will continue to run can be controlled, within limits, and leaving the processor "on" consumes relatively little energy for such a short interval. Accordingly, in this situation, the pre-amp die temperature will typically be within about 1° C. of the HDA ambient temperature as standby is exited. Accordingly, in this situation, the initialization temperature estimate $T_{EA}(0)$ is taken as V(0) divided by A 934.

The described "final value estimator" $T_{EA}(0)$ can be used alone or in combination with the average value estimator. When used in combination with the average value estimator, the final value estimator can make the first estimate, e.g., at power-on, as described, with relatively low impact because it requires relatively little time (such as less than 1 second versus around 200 seconds, for some embodiments).

In at least one embodiment, mode history is accounted for by using offset values ("B factors") which are preferably calculated (and stored on the disk) during factory calibration of the HDD. The following equations illustrate one potential approach to obtaining offset values that can be used in embodiments of the present invention:

$$B_{SS}=A*R_ja*P[slp]+b \quad (1)$$

$$B_S=A*R_ja*P[IP]+b \quad (2)$$

$$B0=A*R_ja*P[Rd]+b \quad (3)$$

$$B1=A*R_ja*P[Wrt]+b \quad (4)$$

Where:
A is the gain of the pre-amp;
$R_ja$ is the thermal resistance, junction-to-ambient;
b is the intrinsic sensor offset (e.g., from linear regression $V=m*(T-T_{res})+b$; m=slope);

P[mode] is power dissipation of the device operating in a mode;
slp is Idle-low power mode, and below (sleep);
IP is Idle-perf mode;
Rd is Read mode;
Wrt is write mode; and,
$T_{res}$ is the "resistance" or baseline temperature of the linear regression model.

Those of skill in the art will understand how to make factory calibration measurements for obtaining offset values, or how to otherwise obtain offset values, at least after understanding the present disclosure.

With regard to equation (1), it is believed that for sleep mode there is relatively little rise in die temperature over ambient. Accordingly, if desired, accuracy in sleep mode can be taken to be that of the sensor itself (i.e., $B_{ss}$=b). If the intrinsic accuracy of the sensor is not sufficient, the value of $B_{ss}$ can be calibrated in the factory with, e.g., external knowledge of the temperature. In one embodiment, the value for $B_s$ is learned during factory calibration relative to $B_{ss}$ and stored with $B_{ss}$. In one embodiment, B0 and B1 are learned during factory calibration relative to $B_s$ and stored with $B_{ss}$. If desired, B1 (for write mode) can be separated further into different values for each recording zone.

Figure 10:
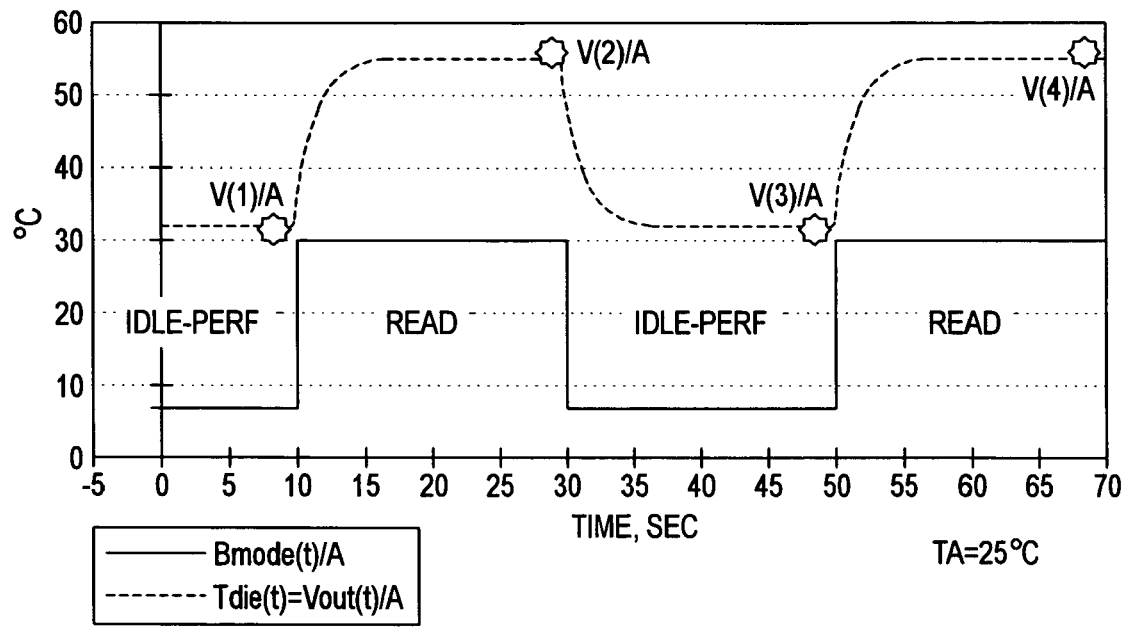
FIG. 10 is a graph illustrating a stimulus series usable in a procedure according to an embodiment of the present invention.

In one embodiment, B-factors are obtained during factory tests. In one approach, a series of mode-switching stimuli are used, as described below. FIG. 10 illustrates a stimulus series believed to be particularly useful for obtaining values of B0 and B1. This series is believed to avoid significant self-heating. In the embodiment of FIG. 10, final and initial value pairs are used to find the offsets. In at least some embodiments, the duty cycle values are forced to 1 in each sub-interval (otherwise a closed loop method can be used). Each sub-interval persists long enough for $\tau_{die}$ to reach its final value (typically t>3 to 5 $\tau_{die}$). Conversely, the period 2t should be less than the time constant of the HDA (to avoid significant self-heating). The difference in magnitude between even and odd final value pairs are the desired mode offset differences. These values can be averaged to improve accuracy (e.g., Avg {ABS [V(k)-V(k-1)]}=B0-$B_s$). The difference between even final value pairs and odd final value pairs is a measure for any change of the HDA temperature. These differences are ideally 0. If they are not 0, the values can be used to adjust the calculated mode offsets.

Figure 11:
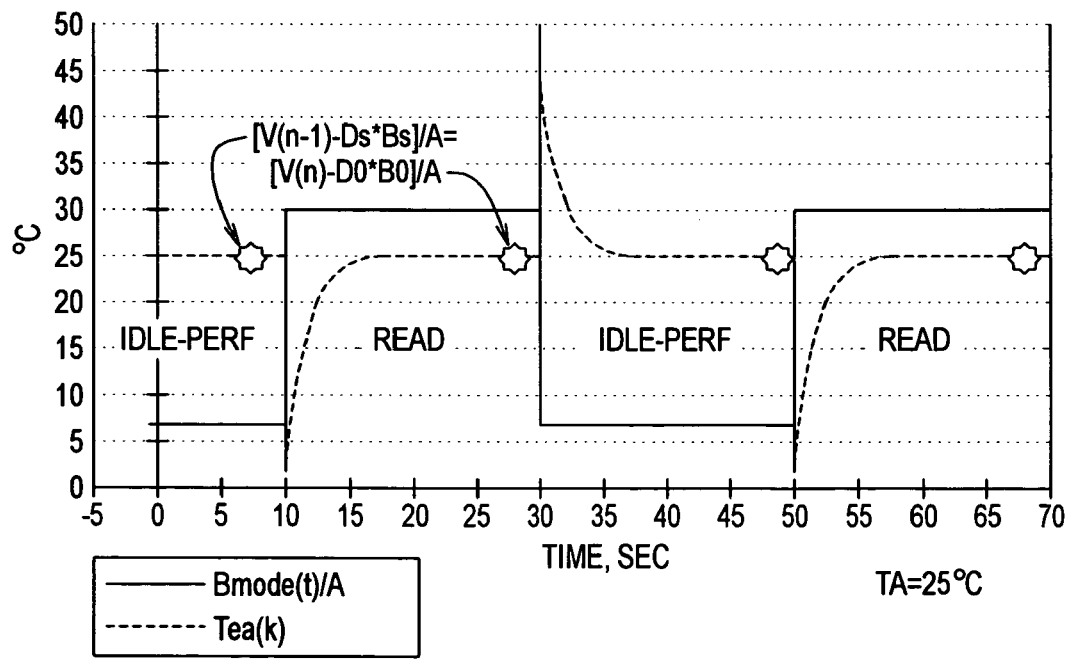
FIG. 11 is a graph illustrating a stimulus series usable in a procedure according to an embodiment of the present invention.

FIG. 11 illustrates a stimulus series for use in the closed loop method of offset calibration. This method forces even and odd final value pairs of $T_{EA}$ to be equal. A simple loop can be closed around this criteria that can improve accuracy. B0 (or B1) is adjusted until the error is inside chosen limits. In this method, the duty cycle no longer needs to be strictly controlled in each sub-interval. Only two modes are allowed for each calibration routine. As before, the difference between even final value pairs and odd final value pairs is a measure for any change of the HDA temperature.

Figure 12A:
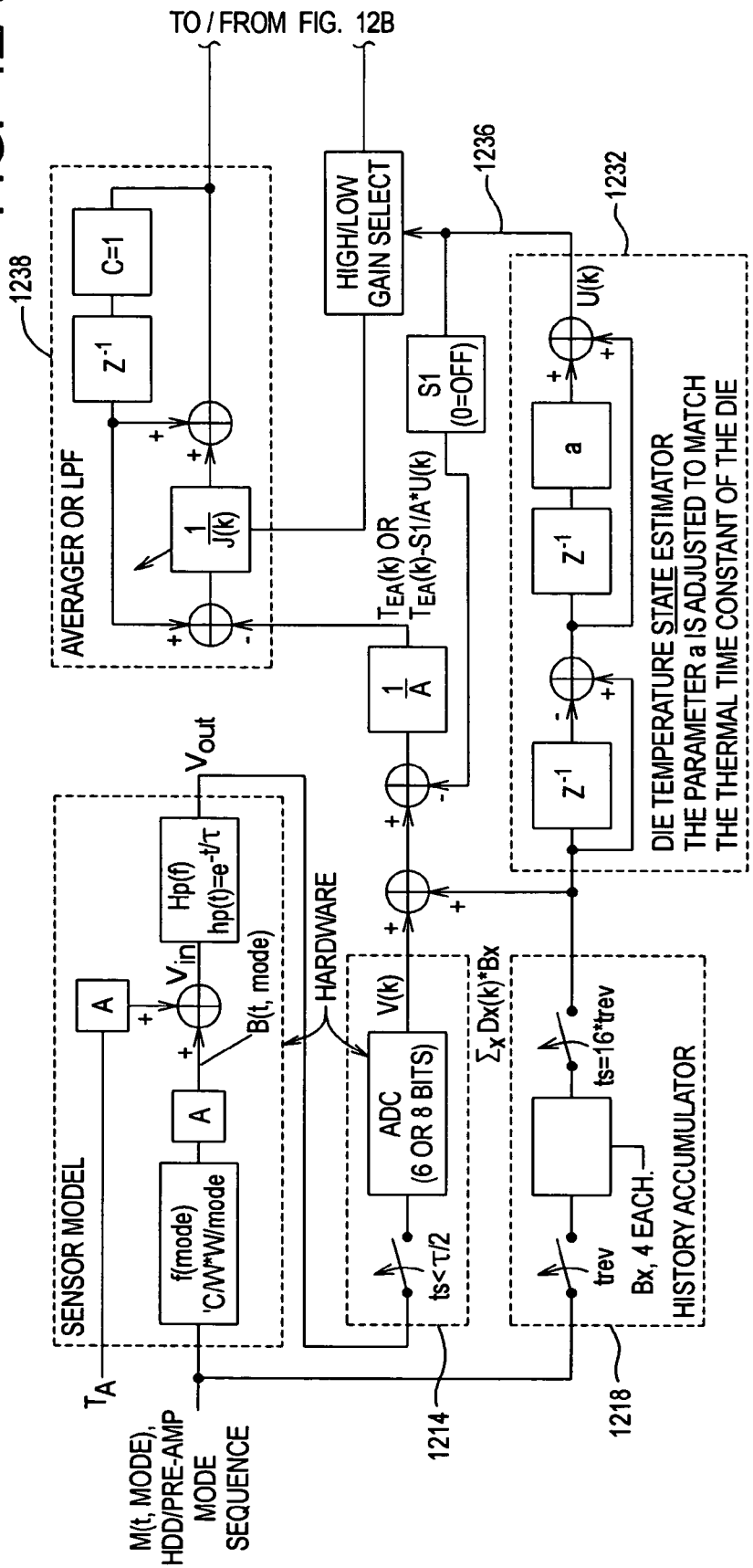
FIGS. 12A and 12B form a flowchart illustrating a procedure according to an embodiment of the present invention.
Figure 12B:
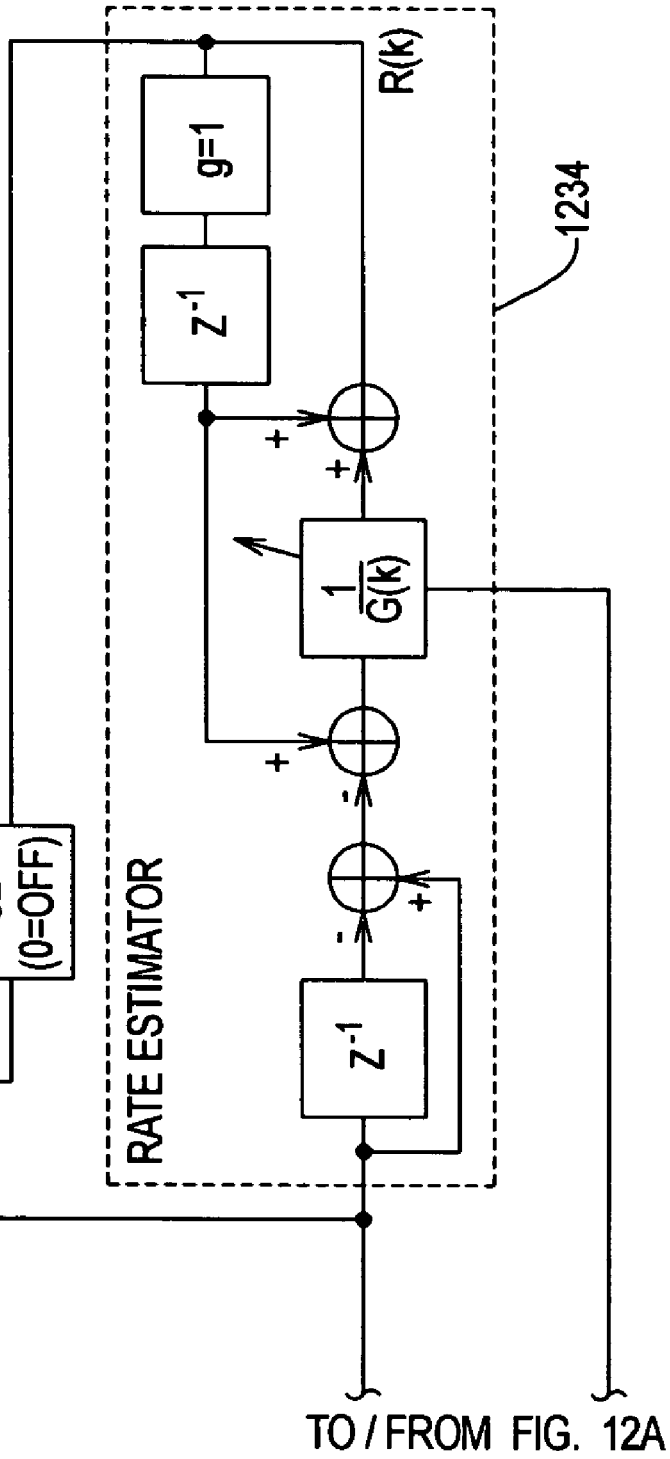

FIGS. 12A and 12B illustrate another embodiment of the present invention. Like the system of FIG. 2, the system of FIGS. 12A and 12B includes an average 1214, and a history accumulator 1218. However, the system of FIGS. 12A and 12B also includes a die temperature state estimator 1232 and a rate estimate of the HDA temperature 1234. The die temperature state estimator 1232 outputs a value (termed "U(k)") 1236. In the illustrated embodiment, $$U(k)=\delta(\Sigma_x D_x(k)*B_x)+a*\delta(\Sigma_x D_x(k-1)*B_x) \quad (5)$$

Where
$D_x$ is the duty cycle of mode x;
$B_x$ is the offset for mode x; and
a is a parameter adjusted to match the thermal time constant of the die.

In the embodiment of FIGS. 12A and 12B, an improved $T_{EA}(k)$ value is provided equal to AVG $[T_{EA}(k)-U(k)/A]$. J successive values of $T_{EA}$ are averaged 1238 and the result provided to the rate estimator 1234.

The system of FIGS. 12A and 12B is believed to allow the main low-pass filter to run at a lower bandwidth (which is now only needed to filter the residual error between the state estimate and the sensor temperature). The state estimate can also be used to control the bandwidth of the main low-pass filter (and that of the rate estimator 1234, if used). In at least some embodiments, the system of FIGS. 12A and 12B is believed to result in substantial reductions in average error, RMS (root mean squared) error and error range, as compared to temperature estimates provided by the system of FIG. 3.

Figure 13:
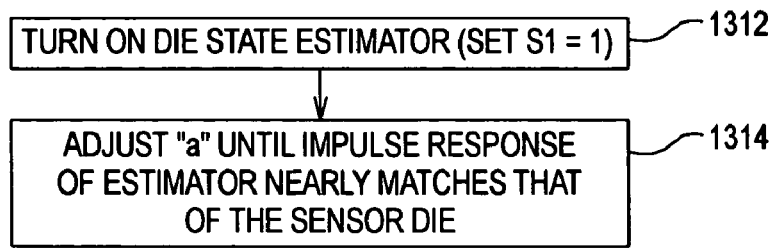
FIG. 13 is a flowchart illustrating a procedure according to an embodiment of the present invention; and, FIG. 14 is a graph illustrating a stimulus series usable in a procedure according to an embodiment of the present invention.
Figure 14:
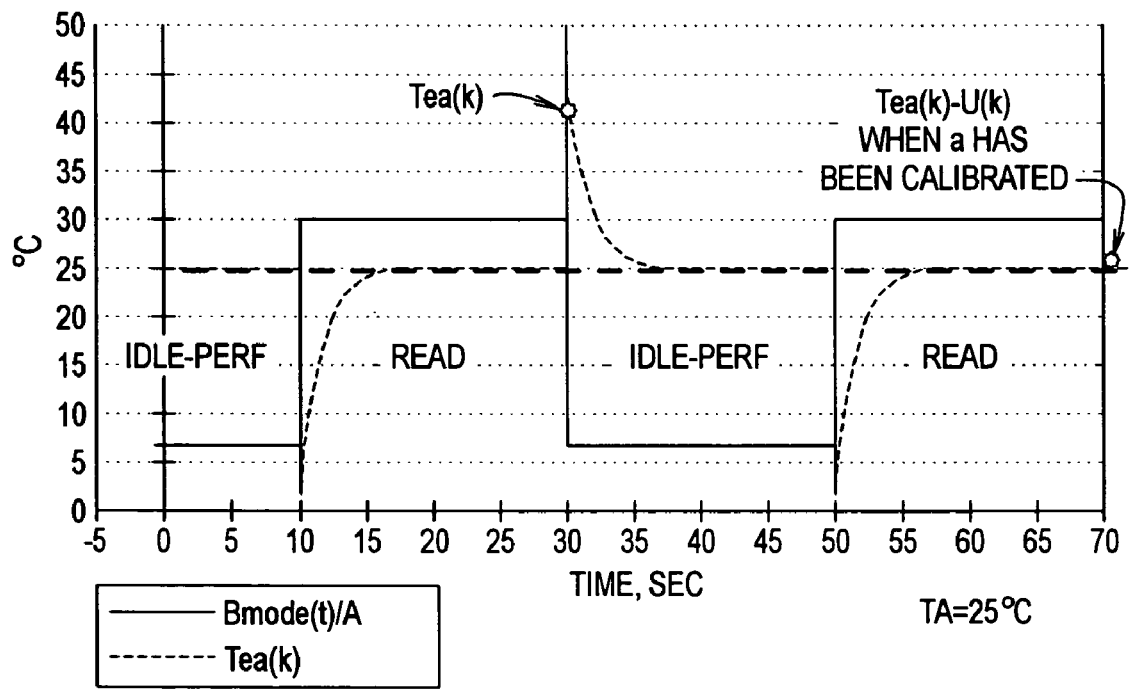

FIG. 13 shows an approach to obtaining the value "a" used in the procedure of FIG. 12. As shown on FIG. 13, the die state estimator is turned on (by setting switch parameter S1=1) 1312. By presenting a stimulus series, e.g., as depicted in the FIG. 14, the parameter (a) is adjusted until the impulse response of the estimator nearly matches that of the sensor die 1314. The metric for making this determination can be, for example, $$\text{Min } [\Sigma|T_{EA}(k)-U(k)|] \quad (6)$$

over one cycle.

In light of the above description, a number of advantages of the present invention can be seen. The present invention can provide accurate, frequent, and low-lag temperature estimates including estimates of a target region spaced from a temperature sensor, without the need for adding BOM costs or packaging costs. The present invention can achieve such estimates substantially without interrupting HDD read and write commands. The present invention requires relatively low processor time. The present invention provides an estimate procedure which can run in all HDD power modes. It is anticipated that worst-case scenarios will yield estimator errors no more than 3-4° C. In some embodiments, sensor accuracy can be substantially achieved, preferably with errors less than about ±2.25° C., more preferably with errors less than about ±1° C. The present invention is believed to provide relatively little lost accuracy by using embodiments of the present invention. Accuracy through this method is believed to readily achieve errors less than about ±2.25° C. over the typical operating range for HDD's. Adjusting and/or calibrating the estimator parameters, if desired, is believed to have the potential for reducing lost accuracy further. Total accuracy can be improved by calibrating for errors in the sensor itself and the ADC, e.g., using methods well known to those skilled in the art.

A number of variations and modifications of the invention can also be used. It is possible to use some features of the invention without using others. For example, it is possible to use mode history information in estimating temperature without performing an averaging of multiple estimates. It is possible to provide a die temperature state estimator without providing a rate estimator. Although a number of procedures have been described which can be used in embodiments of the present invention, it is also possible to provide procedures which differ from those illustrated and described, such as procedures which perform steps in a different order or procedures which have more or fewer steps than those described. Although features of the present invention have been described in the context of temperature estimates in connection with a hard disk drive, it is possible to use aspects of the present invention in connection with a wide variety of electronic devices. Those skilled in the art will understand how to make and use the present invention in such electronic devices, at least after understanding the present disclosure. One example is the use of temperature estimates in connection with microprocessors, e.g., in the control loop of a microprocessor cooling fan/system. Although embodiments of the present invention have been described in the context of examples in which the sensor is located within the HDA, it is also possible to use embodiments of the present invention when the sensor is outside the HDA.

As will be understood by those with skill in the art, at least some features of the present invention can be used with other sensors that may be, e.g., contaminated by operating mode power. For example, the MR (magneto-resistive) read head resistance could provide a more direct measure of temperature near the head-disk interface. The voltage associated with this MR resistance is available as buffered head voltage (BHV) from pre-amplifiers and is typically measured (via a shared ADC) to adjust MR bias current in HDD's. The BHV can be substituted as the input to the estimators described herein, with appropriate changes to estimator parameters, as will be understood by those skilled in the art.

If thermal time constants are not widely different between the HDD and the die and/or if temperature estimates are desired more frequently, other implementations can be employed. In one implementation, two or more estimators of the type depicted FIG. 4 can be provided and timed so as to interleave with respect to one another. In another implementation, by using a recursive form of the average value estimator and the history accumulator, estimates are available as frequently as every $t_s$ interval.

Although embodiments have been described in which the history of operation procedure tracks 3 or 4 different modes, it is possible to provide embodiments of the present invention which provide for tracking more or fewer modes.

Although embodiments have been described in which constant B factor or offset values are based on factory calibrations for each HDD, other embodiments are possible such as having multiple or variable offset values, e.g., to account for variations across recording zones. Although variations among power supplies or from part-to-part can affect power dissipation (and, thus, the B factors, as shown in Equations 1-4), the impact of these factors is currently believed to be relatively small. Nevertheless, if desired, such factors can be used to modify parameters or processes as described herein.

The present invention, in various embodiments, includes components, methods, processes, systems and/or apparatuses substantially as depicted and described herein, including various embodiments, sub-combinations, and subsets thereof. Those skilled in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for estimating a temperature in an electronic device, comprising:
   measuring a temperature at a first location in the electronic device;
   determining an operating mode history of the electronic device; and
   calculating an estimated temperature at a second location in the electronic device based on the measured temperature and the operating mode history.

2. The method of claim 1, wherein measuring the temperature includes measuring sample temperatures at sample times during a time interval and averaging the sample temperatures.

3. The method of claim 2, wherein averaging the sample temperatures includes integrating the sample temperatures.

4. The method of claim 2, wherein averaging the sample temperatures includes accumulating the sample temperatures and dividing the accumulated sample temperatures by the number of sample temperatures.

5. The method of claim 1, wherein determining the operating mode history includes monitoring operating modes of the electronic device during a time interval and determining a fraction of time during the time interval that the electronic device is in each operating mode.

6. The method of claim 5, wherein the operating modes include a read mode and a write mode.

7. The method of claim 5, wherein the operating modes include a read mode, a write mode and an idle mode.

8. The method of claim 5, wherein the operating modes include a read mode, a write mode, an idle mode and a sleep mode.

9. The method of claim 1, wherein determining the operating mode history includes monitoring operating modes of the electronic device at sample times during a time interval and calculating a weighted offset factor for each operating mode.

10. The method of claim 9, wherein calculating the weighted offset factor includes providing a unique predetermined offset factor for the operating mode and weighing the offset factor based on a fraction of time during the time interval that the electronic device is in the operating mode.

11. The method of claim 10, wherein the operating modes include a read mode and a write mode.

12. The method of claim 10, wherein the operating modes include a read mode, a write mode and an idle mode.

13. The method of claim 10, wherein the operating modes include a read mode, a write mode, an idle mode and a sleep mode.

14. The method of claim 1, wherein calculating the estimated temperature includes offsetting temperature changes to a temperature sensor using the operating mode history.

15. The method of claim 1, wherein calculating the estimated temperature includes using a thermal time constant of a temperature sensor.

16. The method of claim 1, wherein calculating the estimated temperature includes scaling an unscaled estimated temperature using a gain factor based on a temperature sensor.

17. The method of claim 1, wherein calculating the estimated temperature includes calculating multiple estimated temperatures and recursively combining the multiple estimated temperatures.

18. The method of claim 1, wherein the method is performed at power-on of the electronic device.

19. The method of claim 1, wherein the method is performed at periodic time intervals.

20. The method of claim 1, wherein the method is performed without delaying or interrupting read or write commands in the electronic device.

21. The method of claim 1, wherein the first location is an integrated circuit chip and the second location is outside the integrated circuit chip.

22. The method of claim 21, wherein the first location is a thermal-diode circuit in the integrated circuit chip.

23. The method of claim 21, wherein the first location is a microprocessor that controls a cooling fan in response to the estimated temperature.

24. The method of claim 21, wherein the first location is a preamplifier and the second location is in a head-disk assembly that includes the preamplifier.

25. The method of claim 24, wherein the estimated temperature is an ambient temperature of the head-disk assembly.

26. The method of claim 1, wherein the electronic device is a disk drive.

27. The method of claim 26, wherein the disk drive includes a head-disk assembly, the head-disk assembly includes a disk that stores data and a head that reads from and writes to the disk, and the estimated temperature is an ambient temperature of the head-disk assembly.

28. The method of claim 27, wherein the first location is in the head-disk assembly.

29. The method of claim 28, wherein the first location is the head.

30. The method of claim 28, wherein the first location is a preamplifier that amplifies a read signal from the head.

31. A method for estimating a temperature in an electronic device, comprising:
measuring a temperature at a first location in the electronic device using a temperature sensor during a time interval;
determining an operating mode history of the electronic device during the time interval by monitoring operating modes of the electronic device and determining a fraction of time during the time interval that the electronic device is in each operating mode; and
calculating an estimated temperature at a second location in the electronic device outside the temperature sensor based on the measured temperature and the operating mode history, thereby offsetting temperature changes to the temperature sensor due to the operating modes.

32. The method of claim 31, wherein measuring the temperature includes measuring sample temperatures at sample times during the time interval and averaging the sample temperatures by accumulating the sample temperatures and dividing the accumulated sample temperatures by the number of sample temperatures.

33. The method of claim 31, wherein determining the operating mode history includes providing a unique predetermined offset factor for each operating mode and weighing the offset factor based on the fraction of time during the time interval that the electronic device is in the operating mode.

34. The method of claim 31, wherein the operating modes include a read mode and a write mode.

35. The method of claim 31, wherein calculating the estimated temperature includes scaling an unscaled estimated temperature using a gain factor based on the temperature sensor.

36. The method of claim 31, wherein calculating the estimated temperature includes calculating multiple estimated temperatures and recursively combining the multiple estimated temperatures.

37. The method of claim 31, wherein the method is performed at power-on of the electronic device and at periodic time intervals.

38. The method of claim 31, wherein the temperature sensor is in a microprocessor that controls a cooling fan in response to the estimated temperature.

39. The method of claim 31, wherein the electronic device is a disk drive that includes a head-disk assembly, the head-disk assembly includes a disk that stores data, a head that reads from and writes to the disk and the temperature sensor, and the estimated temperature is an ambient temperature of the head-disk assembly.

40. The method of claim 39, wherein the temperature sensor is in a preamplifier that amplifies a read signal from the head.

41. In a disk drive that includes a head-disk assembly, wherein the head-disk assembly includes a disk that stores data, a head that reads from and writes to the disk and a temperature sensor, a method for estimating an ambient temperature of the head-disk assembly outside the temperature sensor, comprising:
measuring a temperature using the temperature sensor during a time interval;
determining an operating mode history of the disk drive during the time interval by monitoring operating modes of the disk drive that include a read mode and a write mode and determining a fraction of time during the time interval that the disk drive is in each operating mode; and
calculating the estimated temperature based on the measured temperature and the operating mode history, thereby offsetting temperature changes to the temperature sensor due to the operating modes.

42. The method of claim 41, wherein measuring the temperature includes measuring sample temperatures at sample times during the time interval and averaging the sample temperatures by accumulating the sample temperatures and dividing the accumulated sample temperatures by the number of sample temperatures.

43. The method of claim 41, wherein determining the operating mode history includes providing a unique predetermined offset factor for each operating mode and weighing the offset factor based on the fraction of time during the time interval that the disk drive is in the operating mode.

44. The method of claim 41, wherein the operating modes include an idle mode.

45. The method of claim 41, wherein the operating modes include a sleep mode.

46. The method of claim 41, wherein calculating the estimated temperature includes scaling an unscaled estimated temperature using a gain factor based on the temperature sensor.

47. The method of claim 41, wherein calculating the estimated temperature includes calculating multiple estimated temperatures and recursively combining the multiple estimated temperatures.

48. The method of claim 41, wherein the method is performed at power-on of the disk drive and at periodic time intervals.

49. The method of claim 41, wherein the temperature sensor is the head.

50. The method of claim 41, wherein the temperature sensor is a preamplifier that amplifies a read signal from the head.

51. In a disk drive that includes a head-disk assembly, wherein the head-disk assembly includes a disk that stores data, a head that reads from and writes to the disk and a preamplifier that amplifies a read signal from the head, and the preamplifier includes a temperature sensor, a method for estimating an ambient temperature of the head-disk assembly outside the preamplifier, comprising:

measuring a temperature in the preamplifier using the temperature sensor during a time interval;

determining an operating mode history of the preamplifier during the time interval by monitoring operating modes of the preamplifier that include a read mode and a write mode and determining a fraction of time during the time interval that the preamplifier is in each operating mode; and calculating the estimated temperature based on the measured temperature and the operating mode history, thereby offsetting temperature changes to the temperature sensor due to the operating modes.

52. The method of claim 51, wherein measuring the temperature includes measuring sample temperatures at sample times during the time interval and averaging the sample temperatures by accumulating the sample temperatures and dividing the accumulated sample temperatures by the number of sample temperatures.

53. The method of claim 51, wherein determining the operating mode history includes providing a unique predetermined offset factor for each operating mode and weighing the offset factor based on the fraction of time during the time interval that the preamplifier is in the operating mode.

54. The method of claim 51, wherein the operating modes include an idle mode.

55. The method of claim 51, wherein the operating modes include a sleep mode.

56. The method of claim 51, wherein calculating the estimated temperature includes using a thermal time constant of the preamplifier.

57. The method of claim 51, wherein calculating the estimated temperature includes scaling an unscaled estimated temperature using a gain factor based on the temperature sensor.

58. The method of claim 51, wherein calculating the estimated temperature includes calculating multiple estimated temperatures and recursively combining the multiple estimated temperatures.

59. The method of claim 51, wherein the method is performed at power-on of the disk drive and at periodic time intervals.

60. The method of claim 51, wherein the temperature sensor is a thermal-diode circuit.

* * * * *